US009736031B2

(12) United States Patent
Sakaki

(10) Patent No.: US 9,736,031 B2
(45) Date of Patent: Aug. 15, 2017

(54) INFORMATION SYSTEM CONSTRUCTION ASSISTANCE DEVICE, INFORMATION SYSTEM CONSTRUCTION ASSISTANCE METHOD, AND INFORMATION SYSTEM CONSTRUCTION ASSISTANCE PROGRAM

(71) Applicant: NEC Corporation, Minato-ku, Tokyo (JP)

(72) Inventor: Hiroshi Sakaki, Tokyo (JP)

(73) Assignee: NEC CORPORATION, Toyko (JP)

(*) Notice: Subject to any disclaimer, the term of this patent is extended or adjusted under 35 U.S.C. 154(b) by 314 days.

(21) Appl. No.: 14/434,482

(22) PCT Filed: Oct. 8, 2013

(86) PCT No.: PCT/JP2013/005979
§ 371 (c)(1),
(2) Date: Apr. 9, 2015

(87) PCT Pub. No.: WO2014/061229
PCT Pub. Date: Apr. 24, 2014

(65) Prior Publication Data
US 2015/0288574 A1 Oct. 8, 2015

(30) Foreign Application Priority Data

Oct. 16, 2012 (JP) .................................. 2012-229304

(51) Int. Cl.
*G06F 3/00* (2006.01)
*H04L 12/24* (2006.01)
(Continued)

(52) U.S. Cl.
CPC .......... *H04L 41/22* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS 6,789,252 B1 * 9/2004 Burke ...................... G06F 8/10
717/100
7,042,468 B2 * 5/2006 Schwegler, Jr. ..... G06F 17/5004
345/629
(Continued)

FOREIGN PATENT DOCUMENTS

JP 2010-218049 A 9/2010
JP 2011-13716 A 1/2011
(Continued)

OTHER PUBLICATIONS

International Search Report for PCT Application No. PCT/JP2013/005979, mailed on Dec. 10, 2013.
English Translation for Write Opinion of PCT/JP2013/005979.

*Primary Examiner* — Toan Vu

(57) ABSTRACT

An information system construction assistance device includes a selection screen presentation unit that presents a selection screen for selecting a requirement item group provided according to a specific task requirement, an input screen presentation unit that presents an input screen for inputting parameters included in the selected requirement item group, a system model selection unit that selects a system model satisfying the construction requirements, an operation information acquisition unit that acquires operation information of an existing system based on a selected system model group, a performance evaluation unit that evaluates a performance of a selected system model using the parameters of the operation information, and a construction candidate presentation unit that compares the performance and the construction requirements and presents an information system which is constructible using the system model produced after determining a sizing factor for the selected system model.

12 Claims, 11 Drawing Sheets

(51) Int. Cl.
    *G06F 9/44*       (2006.01)
    *G06F 3/0484*     (2013.01)
    *H04L 29/08*      (2006.01)
    *G06F 3/01*       (2006.01)

(52) U.S. Cl.
    CPC ............ *G06F 8/20* (2013.01); *H04L 41/0806*
                     (2013.01); *H04L 67/10* (2013.01)

(56)               References Cited

U.S. PATENT DOCUMENTS

| | | | |
|---|---|---|---|
| 2004/0152946 A1* | 8/2004 | Franck | A61N 1/08 |
| | | | 600/25 |
| 2005/0038636 A1* | 2/2005 | Wakelam | G06F 17/5004 |
| | | | 703/1 |
| 2006/0064335 A1* | 3/2006 | Goldszmidt | G06Q 10/00 |
| | | | 705/7.27 |
| 2006/0107216 A1* | 5/2006 | Cooper | G06F 17/30799 |
| | | | 715/724 |
| 2012/0116996 A1* | 5/2012 | Varma | G06Q 40/06 |
| | | | 705/36 R |
| 2014/0067448 A1* | 3/2014 | Joshi | G06Q 10/063112 |
| | | | 705/7.12 |
| 2015/0026308 A1* | 1/2015 | MacTiernan | H04N 21/23424 |
| | | | 709/219 |

FOREIGN PATENT DOCUMENTS

| | | |
|---|---|---|
| JP | 2011-242964 A | 12/2011 |
| WO | 03/021516 A1 | 3/2003 |

\* cited by examiner

Fig.4

PARAMETER INPUT SCREEN (USE PACKAGE)

☐ SCHEDULER  ▷ PARAMETER

NUMBER OF USERS

NUMBER OF FACILITIES

NUMBER OF BASES

☐ PATENT MANAGEMENT PACKAGE  ▷ PARAMETER

☐ SAP  ▷ PARAMETER gb

Fig.7

| | | GB |
|---|---|---|
| REQUEST | ARRIVAL RATE | 150 |
| AP MESSAGE TRANSMISSION | AVERAGE SIZE | 0 |
| WEB LOAD | AVERAGE CPU TIME | 0.0010 |
| WEB READ LOAD | _DISK READ TIME | 0 |
| WEB WRITE LOAD | _DISK WRITE TIME | 0 |
| SQL EXECUTION | AVERAGE SIZE | 0 |
| AP LOAD | AVERAGE CPU TIME | 0.0030 |
| AP WRITE LOAD | _DISK WRITE TIME | 0 |

INFORMATION SYSTEM CONSTRUCTION ASSISTANCE DEVICE, INFORMATION SYSTEM CONSTRUCTION ASSISTANCE METHOD, AND INFORMATION SYSTEM CONSTRUCTION ASSISTANCE PROGRAM

This application is a National Stage Entry of PCT/JP2013/005979 filed on Oct. 8, 2013, which claims priority from Japanese Patent Application 2012-229304 filed on Oct. 16, 2012, the contents of all of which are incorporated herein by reference, in their entirety.

TECHNICAL FIELD

The present invention relates to an information system construction assistance device, an information system construction assistance method, and an information system construction assistance program.

BACKGROUND ART

With the advance of cloud computing technology, it has become possible for a user using a cloud environment to construct and manage relatively easily an information system having a size necessary for operations by aggregating servers, storages, and the like necessary to operate the information system on a virtual data center. PTL 1 described below discloses a system that assists a construction of a new virtual environment using a virtual environment constructed in the past under a virtual environment of a computer.

The system described in PTL 1 presents past virtual environments similar to construction requirements to the user when the user inputs the construction requirements for constructing a virtual environment. The system provides to the user a virtual environment selected by the user from the presented past virtual environments. The construction requirements include, for example, hardware to be used, resources to be used, a specified task or use, and condition information of an application.

CITATION LIST

Patent Literature

PTL 1: Japanese Laid-open Patent Publication No. 2011-242964
PTL 2: Japanese Laid-open Patent Publication No. 2010-218049

SUMMARY OF INVENTION

Technical Problem

The system described in PTL 1 does not present anything about how the past virtual environments presented to the user are similar to the construction requirements. Therefore, it is not easy for the user to select an optimal virtual environment according to the construction requirements from the presented past virtual environments.

The present invention has been achieved to solve the problem described above and one object of the present invention is to provide an information system construction assistance device, an information system construction assistance method, and an information system construction assistance program capable of presenting an optimal information system according to construction requirements desired by the user.

Solution to Problem

An information system construction assistance method including:
presenting a selection screen for selecting a requirement item group provided according to a specific task requirement in inputting construction requirements of a construction expected system that is an information system to be constructed;
presenting an input screen for inputting parameters included in the selected requirement item group;
selecting a system model satisfying the construction requirements based on the input parameters from the system models set as design information units of a previously stored system;
acquiring operation information of an existing system that is an already constructed information system, on the basis of the selected system model and a similar system model similar to the system model;
evaluating a performance of the selected system model, using parameters which are included in the acquired operation information; and
comparing the performance of the system model evaluated and the construction requirements based on the input parameters, and presenting an information system in which a system factor for determining a size of a system included in the design information of the selected system model is constructible by using the selected system model, as a candidate of the construction expected system.

A non-transitory computer readable medium that stores an information system construction assistance program causing a computer to execute:
presenting a selection screen for selecting a requirement item group provided according to a specific task requirement in inputting construction requirements of a construction expected system that is an information system to be constructed;
presenting an input screen for inputting parameters included in the selected requirement item group;
selecting a system model satisfying the construction requirements based on the input parameters from the system models set as design information units of a previously stored system;
acquiring operation information of an existing system that is an already constructed information system, on the basis of the selected system model and a similar system model similar to the system model;
evaluating a performance of the selected system model, using parameters which are included in the acquired operation information; and
comparing the performance of the evaluated system model and the construction requirements based on the input parameters, and presenting an information system in which a system factor for determining a size of a system included in the design information of the selected system model is constructible by using the selected system model, as a candidate of the construction expected system.

A recording medium that stores an information system construction assistance program of the exemplary embodiment of the present invention, causing a computer to execute:
a selection screen presentation step of presenting a selection screen for selecting a requirement item group provided according to a specific task requirement in inputting construction requirements of a construction expected system that is an information system to be constructed;

an input screen presentation step of presenting an input screen for inputting parameters included in the selected requirement item group;

a system model selection step of selecting a system model satisfying the construction requirements based on the input parameters from the system models set as design information units of a previously stored system;

an operation information acquisition step of acquiring operation information of an existing system that is an already constructed information system, on the basis of the system model selected in the system model selection step and a similar system model similar to the system model;

a performance evaluation step of evaluating a performance of the system model selected in the system model selection step, using parameters which are included in the operation information acquired in the operation information acquisition step; and a construction candidate presentation step of comparing the performance of the system model evaluated in the performance evaluation step and the construction requirements based on the input parameters, and presenting an information system in which a system factor for determining a size of a system included in the design information of the system model selected by the system model selection step is constructible by using the selected system model, as a candidate of the construction expected system.

Advantageous Effects of Invention

The present invention makes it possible to present an information system according to construction requirements desired by the user.

BRIEF DESCRIPTION OF DRAWINGS

FIG. 4 illustrates one example of a screen configuration displayed in a parameter input screen display area illustrated in FIG. 2;

FIG. 7 illustrates one example of a screen displaying evaluation parameters;

DESCRIPTION OF EMBODIMENTS

In the following, with reference to the accompanying drawings, preferred exemplary embodiments of an information system construction assistance device, an information system construction assistance method, and an information system construction assistance program according to the present invention will be described. The information system construction assistance device in the exemplary embodiment is a device that evaluates a performance of an information system constructed using a virtual machine under a cloud environment and assists a construction of an information system matched with construction requirements input by the user.

Figure 1:
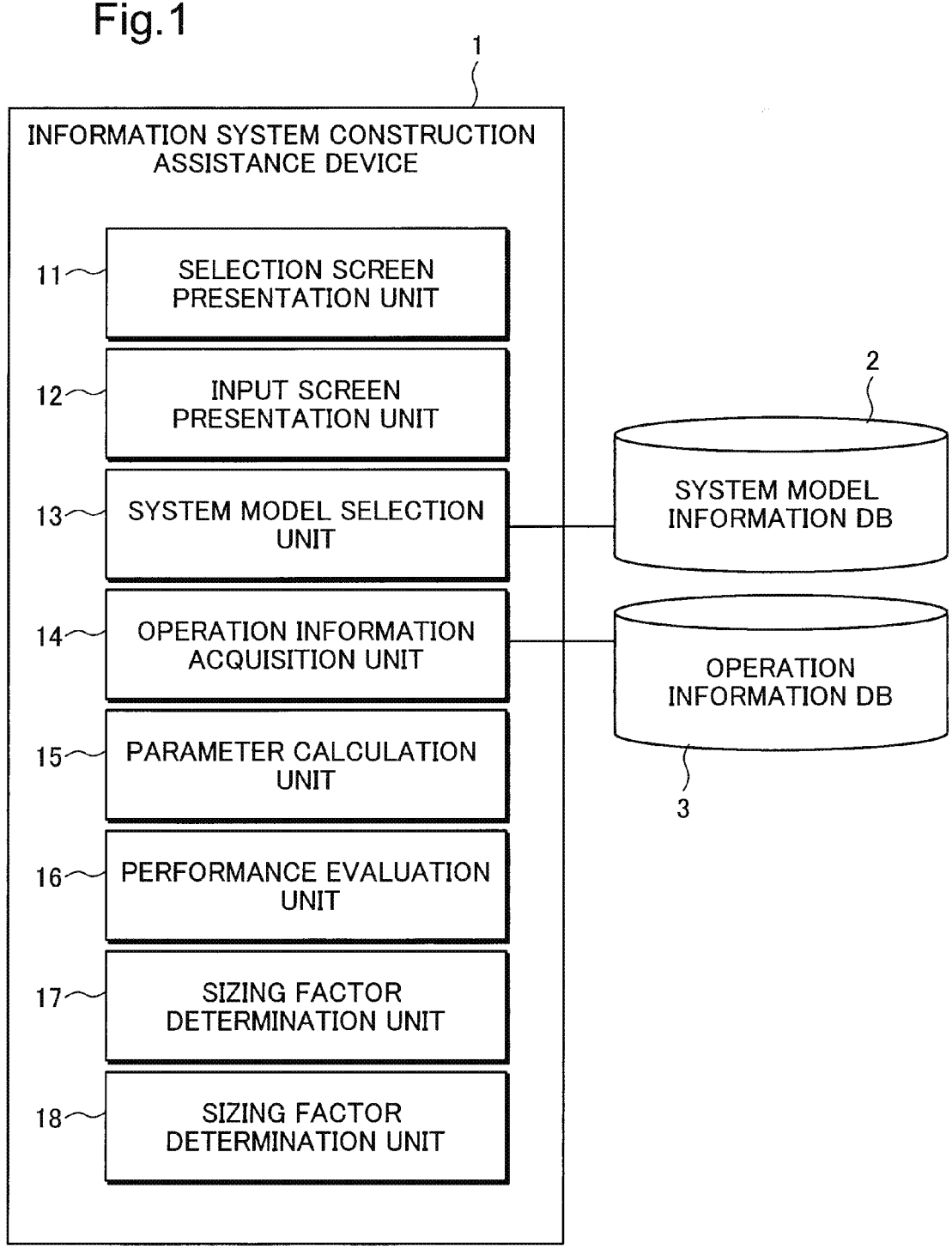
FIG. 1 is a diagram exemplarily illustrating a configuration of an information system construction assistance device in an exemplary embodiment.

First, with reference to FIG. 1, a configuration of the information system construction assistance device in the exemplary embodiment will be described. As illustrated in FIG. 1, an information system construction assistance device 1 includes, for example, a selection screen presentation unit 11, an input screen presentation unit 12, a system model selection unit 13, an operation information acquisition unit 14, a parameter calculation unit 15, a performance evaluation unit 16, a sizing factor (system factor) determination unit 17, and a construction candidate presentation unit 18.

Figure 11:
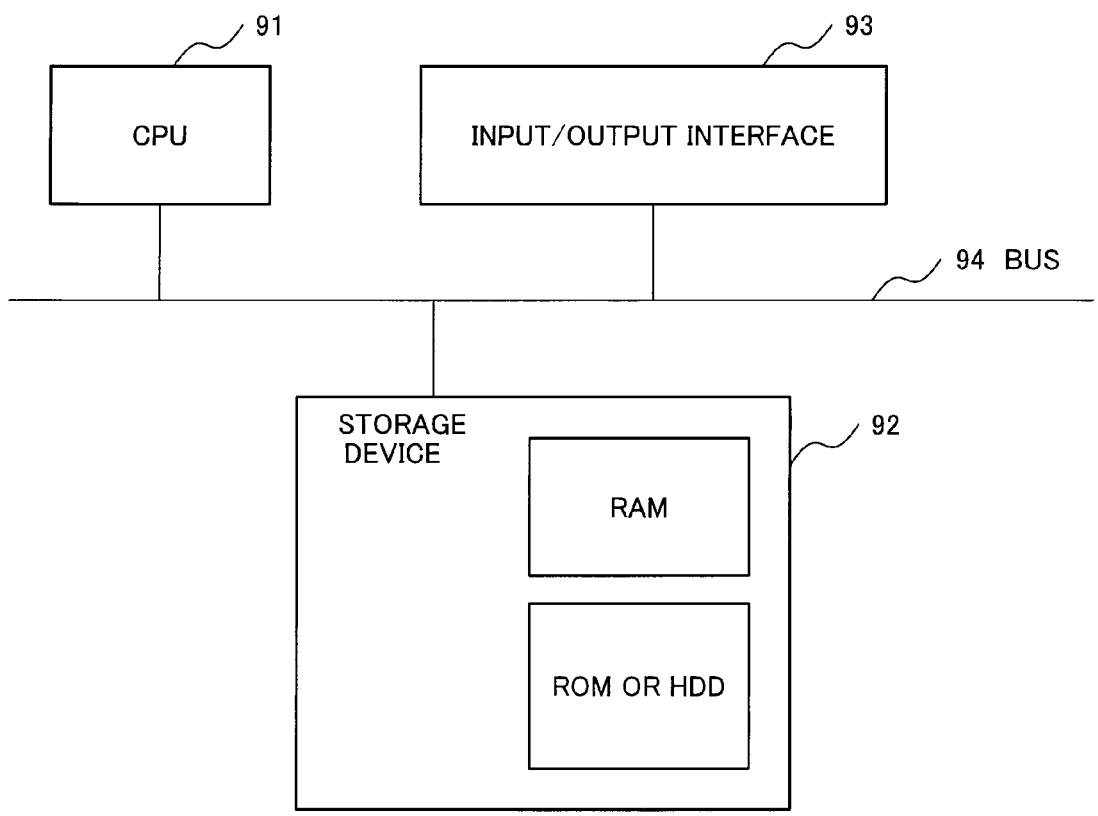
FIG. 11 is a diagram illustrating one example of a hardware configuration for realizing the information system construction assistance device in the exemplary embodiment.

FIG. 11 illustrates one example of a hardware configuration for realizing the information system construction assistance device in the exemplary embodiment. The information system construction assistance device 1 may physically include a computer device including, for example, a CPU (Central Processing Unit) 91, a storage device 92, and an input/output interface 93. The storage device includes, for example, a ROM (Read Only Memory) and an HDD (Hard Disk Drive) storing a program and data processed by the CPU, and a RAM (Random Access Memory) used as various types of work areas mainly for control processing. These respective elements are connected to each other via a bus 94. The CPU executes the program stored on the ROM and processes a message received via the input/output interface, data developed on the RAM, and the like to realize functions of the respective units in the information system construction assistance device 1.

Figure 2:
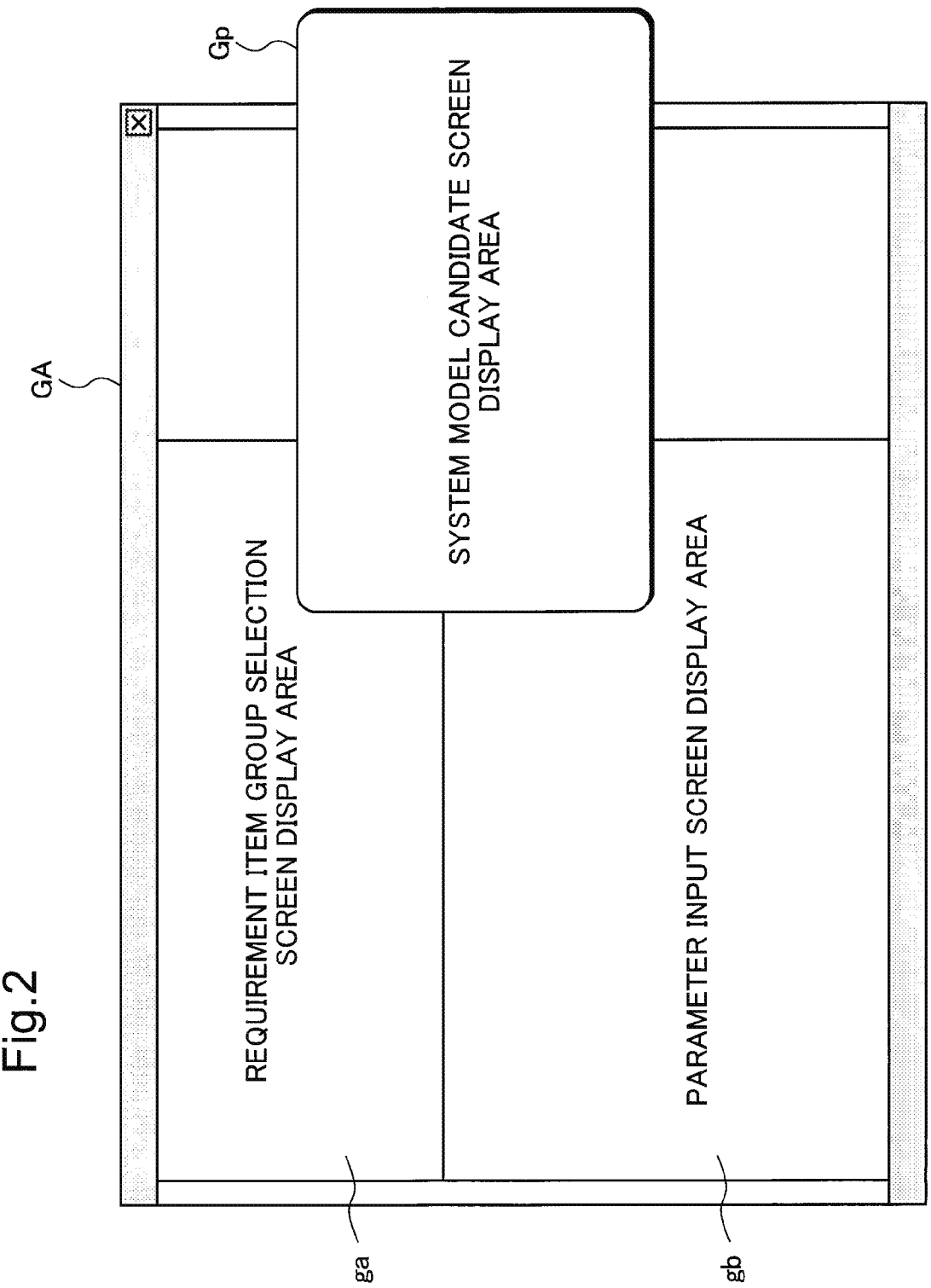
FIG. 2 illustrates one example of a screen used upon constructing an information system by the user.

The user accesses the information system construction assistance device 1 by operating a user terminal (not illustrated), uses various types of screens provided by the information system construction assistance device 1, and determines an information system expected to be constructed from now (hereinafter, referred to as a "construction expected system"). With reference to FIG. 2, a screen used by the user will be described. FIG. 2 illustrates one example of a screen used upon constructing an information system by the user. On a display screen GA, an area ga for displaying a requirement item group selection screen to be described later and an area gb for displaying a parameter input screen to be described later are disposed. Further, on the display screen GA, an area Gp for displaying a system model candidate screen to be described later is popup-displayed as necessary.

The selection screen presentation unit 11 illustrated in FIG. 1 presents a requirement item group selection screen to the user. The requirement item group selection screen refers to a screen for causing the user to select a requirement item group provided according to a specific task requirement.

Figure 3:
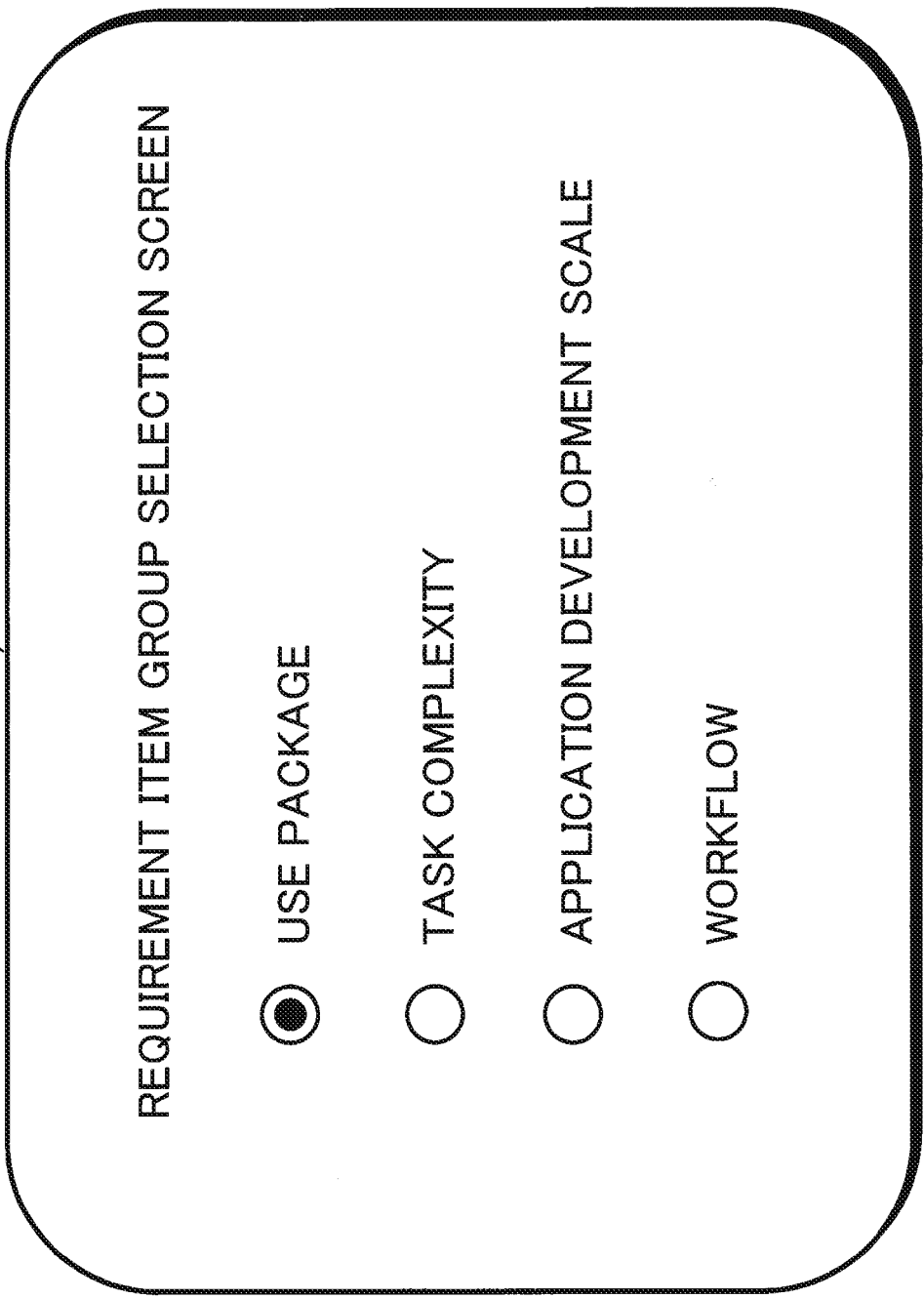
FIG. 3 illustrates one example of a screen configuration displayed in a requirement item group selection screen display area illustrated in FIG. 2.

FIG. 3 illustrates one example of the requirement item group selection screen. On the requirement item group selection screen ga, a use package, task complexity, an application development scale, and a workflow are displayed as an example of the requirement item group. The user selects any one of the requirement item groups from the requirement item group selection screen.

When the selection of the requirement item group is established in the requirement item group selection screen presented to the user by the selection screen presentation unit 11, the input screen presentation unit 12 illustrated in FIG. 1 presents a parameter input screen for inputting parameters included in the selected requirement item group to the user. The parameters may be a scheduler, the number of users, the number of facilities, the number of points, and the like when, for example, the requirement item group is set as a use package.

Figure 5:
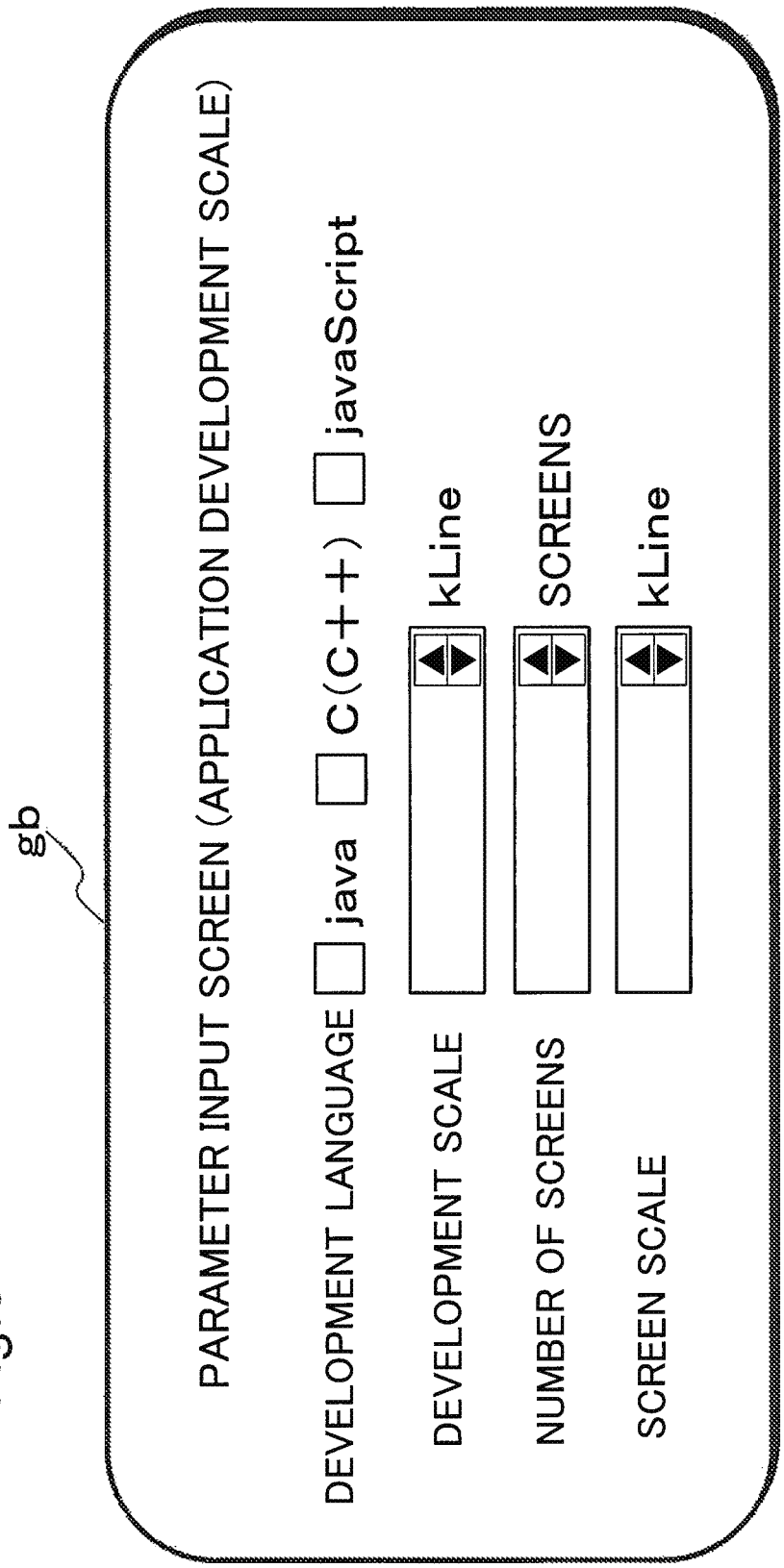
FIG. 5 illustrates one example of the screen configuration displayed in the parameter input screen display area illustrated in FIG. 2.

FIG. 4 and FIG. 5 each illustrate one example of the parameter input screen. FIG. 4 illustrates one example of the parameter input screen displayed when "use package" is selected from the requirement item group of the requirement item group selection screen. The parameter input screen illustrated in FIG. 4 displays a scheduler, the number of users, the number of facilities, the number of points, and the like as one example of the parameters set in "use package". FIG. 5 illustrates one example of the parameter input screen displayed when "application development scale" is selected from the requirement item group of the requirement item group selection screen. The parameter input screen illustrated in FIG. 5 displays development language, a development scale, the number of screens, and the like as one example of the parameters set in "application development scale". The user inputs parameters to be bases of construction requirements using the parameter input screen.

According to the information system construction assistance device 1 of the present exemplary embodiment, when a requirement item group is selected from the requirement item group selection screen and parameters set in the selected requirement item group are input, an information system can be constructed. This makes it possible for the user to construct an information system without directly inputting complex construction requirements by himself.

The construction requirements include, for example, functional requirements and service level requirements. The functional requirements are conditions for determining a role played by an application and include functions such as, for example, data processing, data store, image analysis, response creation, statistical processing, and inventory management. The service level requirements are conditions for determining a guarantee level of quality provided by a construction expected system and include guarantee levels such as, for example, throughput, maximum CPU usage rate, maximum disk usage rate, network usage rate, and TAT (Turn Around Time).

When inputs of parameters are established in a parameter input screen presented to the user by the input screen presentation unit 12, the system model selection unit 13 illustrated in FIG. 1 selects a system model satisfying construction requirements based on the input parameters by referring to a system model information DB2. The system model selection unit 13 selects a plurality of system models when a plurality of system models satisfying the construction requirements exists.

The system model is a model set as a design information unit for constructing an information system. The design information includes pieces of information describing, for example, a configuration of a network, a configuration of a server, a relation among components of an application, a processing flow indicating an operation of the application and the like.

The system model information DB 2 is a database that stores system model information including design information of an already constructed information system (hereinafter, referred to as an "existing system"). The system model information DB 2 is designed so system model information can be searched by using construction requirements as keys. The system model information DB 2 may be included within the information system construction assistance device 1 or may be provided outside.

Figure 6:
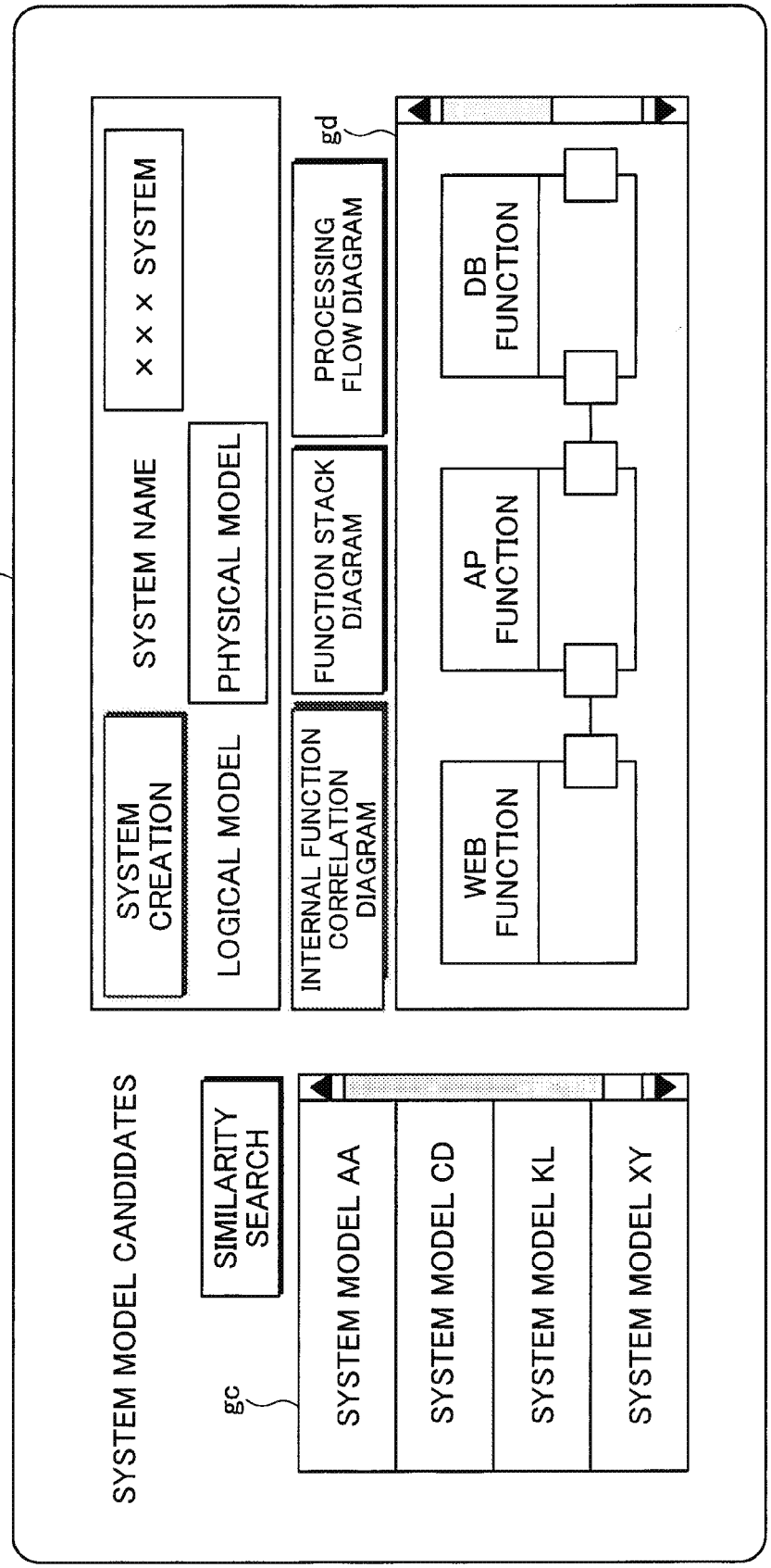
FIG. 6 illustrates one example of a screen configuration displayed in a system model candidate screen display area illustrated in FIG. 2.

FIG. 6 illustrates one example of a system model candidate screen. As illustrated in FIG. 6, on a system model candidate display screen Gp, a selection area gc for selecting a system model to be employed for performance evaluation and a display area gd for displaying a model diagram of the system model selected in the selectin area gc are disposed.

The selection area gc displays one or a plurality of system models selected by the system model selection unit 13. The model diagram displayed in the display area gc includes, for example, an internal function correlation diagram, a function stack diagram, a processing flow diagram and the like. The user causes a performance evaluation of a construction expected system and a construction of an information system to be executed, using the system model candidate display area Gp. Specifically, the user selects, for example, one system model in the selection area gc and causes a performance evaluation of a construction expected system to be executed by clicking a similarity search button. The user having accepted the evaluation result causes a construction of an information system to be executed by clicking a system creation button.

The information system construction assistance device 1 in the present exemplary embodiment makes it possible for the user to receive a presentation of a system model by inputting parameters associated with a requirement item group selected by himself. This makes it possible for the user to construct an information system while recognizing that a system model selected by the system model selection unit 13 is a system model satisfying construction requirements associated with a specific task requirement selected by himself.

The operation information acquisition unit 14 illustrated in FIG. 1 acquires operation information of an existing system constructed in the past by employing a system model selected by the system model selection unit 13, from an operation information DB 3. When a plurality of system models exists by the selection of the system model selection unit 13, the operation information acquisition unit 14 acquires operation information of an existing system employing a system model selected by the user in the selection area gc from the operation information DB 3.

The operation information acquisition unit 14 further acquires operation information of an existing system constructed in the past by employing a system model similar to the system model selected by the system model selection unit 13, from the operation information DB 3. In the present exemplary embodiment, for convenience of description, a set of the system model selected by the system model selection unit 13 and a system model similar to the system model is referred to as a "selected system model group".

As the system model similar to the selected system model, for example, a system model having design information different from design information of the selected system model only in a sizing factor of a server may be employed.

The sizing factor of the server refers to a factor (system factor) for determining a size of a server and includes, for example, the number of servers and the number of cores of a CPU mounted in the server and the like. In the present exemplary embodiment, the case where a sizing factor of a server is illustratively employed as a system factor will be described without limitation thereto, and a value of a band of a network and the like, a factor relevant to work, and the like can be included in the system factor. In other words, the system factor may be a factor for determining a size of a system.

The operation information refers to information managed by an operator operating an information system and includes, for example, a load of a CPU, a processing number of requests, and a failure history of a hard disk.

The operation information DB 3 refers to a database that stores operation information of an existing system. The operation information DB 3 is designed so that searching for operation information becomes possible by using a system model as a key. The operation information DB 3 may be included within the information system construction assistance device 1 or may be provided outside.

The parameter calculation unit 15 calculates evaluation parameters used upon evaluating non-functional requirements such as a performance and reliability of an information system, expandability, security, mission critical properties (hereinafter, referred to as "MC (Mission Critical) properties"), and the like, using parameters which are included in operation information acquired by the operation information acquisition unit 14. Indicators of the non-functional requirements increase with increases in quality indicators such as reliability, availability, serviceability, and the like and performance indicators such as performance and the like.

As the parameters included in the operation information, usable are, for example, an arrival rate of requests, an average transmission size of application messages, a Web load represented by an average CPU time, a Web read load represented by a disk read time, a Web write load represented by a disk write time, an average size during SQL execution, an application load represented by an average CPU time, and an application write load represented by a disk write time, may be used The evaluation parameter is provided in accordance with each parameter included in operation information of a selected system model group acquired by the operation information acquisition unit 14. As a value of the evaluation parameter, an average value of parameter values of the selected system model group is set.

FIG. 7 illustrates one example of a display screen of evaluation parameters. As illustrated in FIG. 7, on an evaluation parameter display screen GB, item names of evaluation parameters and values of the evaluation parameters are displayed in a list format.

The performance evaluation unit 16 illustrated in FIG. 1 evaluates a performance of a system model selected by the system model selection unit 13, using evaluation parameters calculated by the parameter calculation unit 15.

The sizing factor determination unit 17 compares the result obtained by the evaluation performed by the performance evaluation unit 16 and service level requirements based on parameters input by the user and determines a sizing factor of the system model selected by the system model selection unit 13. In other words, the sizing factor determination unit 17 determines the sizing factor of the selected system model so that the system model selected by the system model selection unit 13 satisfies the service level requirements based on the parameters input by the user.

The construction candidate presentation unit 18 presents an information system constructible using a system model after the sizing factor determination by the sizing factor determination unit 17 to a user terminal as a candidate of the construction expected system.

Figure 8:
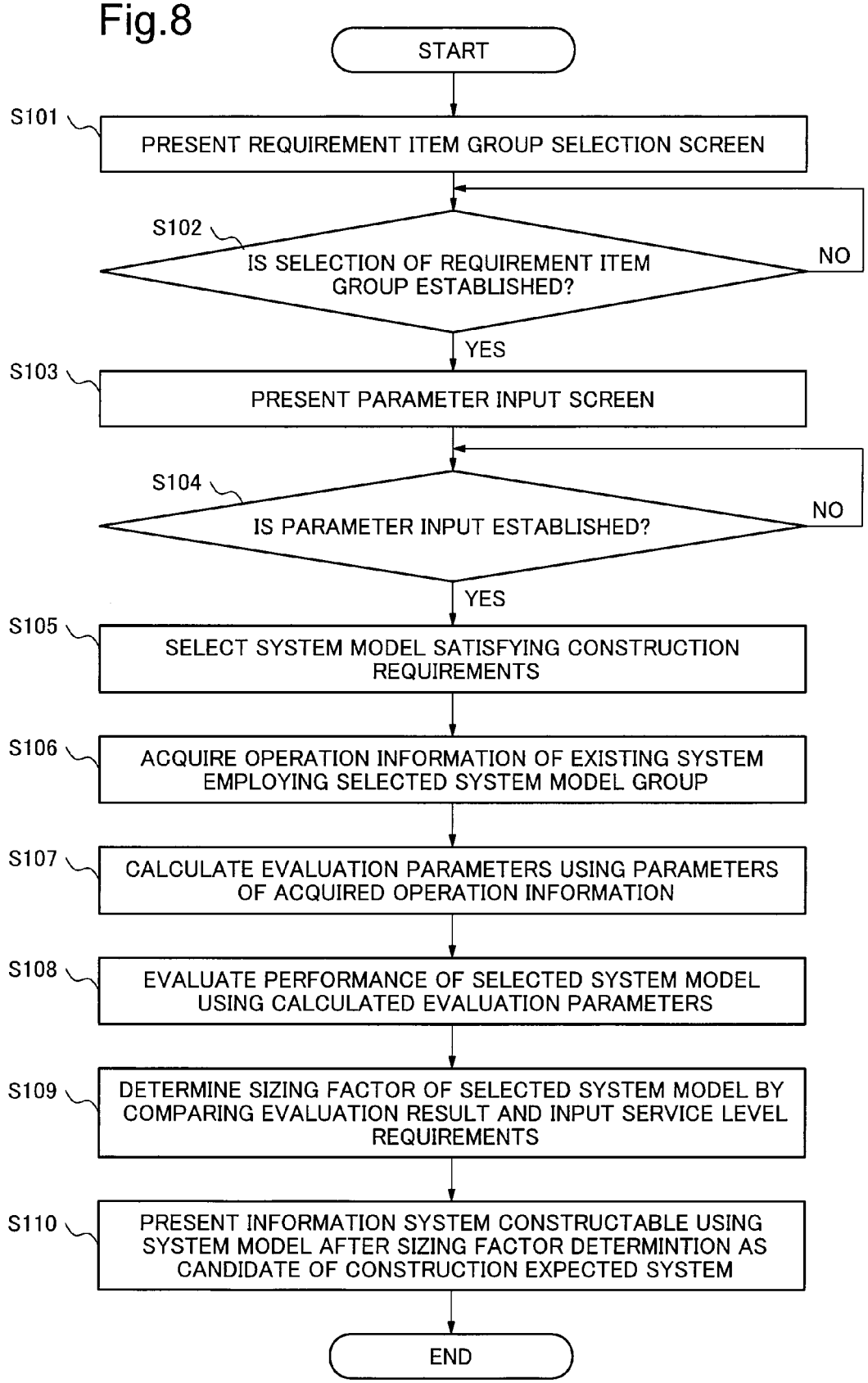
FIG. 8 is a flowchart for illustrating a procedure used upon assisting a construction of an information system.

Next, with reference to FIG. 8, an operation of the information system construction assistance device 1 will be described. FIG. 8 is a flowchart for illustrating a procedure used upon assisting a construction of an information system.

First, the selection screen presentation unit 11 presents a requirement item group selection screen to the user (step S101).

When a selection of a requirement item group is established in the requirement item group selection screen (step S102; YES), the input screen presentation unit 12 presents a parameter input screen for inputting parameters included in the selected requirement item group to the user (step S103).

When the input of the parameters is established in the parameter input screen (step S104; YES), the system model selection unit 13 selects a system model satisfying construction requirements based on the input parameters by referring to the system model information DB2 (step S105). When a plurality of selected system models exists, the user selects any one of the system models to be narrowed down to one system model to be selected in step S105.

The operation information acquisition unit 14 acquires operation information of an existing system employing both the system model selected in step S105 and a system model similar to the system model from the operation information DB3 (step S106).

The parameter calculation unit 15 calculates evaluation parameters used upon evaluating non-functional requirements of an information system, using parameters which are included in the operation information acquired in step S106 (step S107).

The performance evaluation unit 16 evaluates a performance of the system model selected in step S105, using the evaluation parameters calculated in step S107 (step S108).

The sizing factor determination unit 17 compares the evaluation result obtained in step S108 and service level requirements based on the parameters input in step S103 and determines a sizing factor of the system model selected in step S105 (step S109).

The construction candidate presentation unit 18 presents an information system constructible using the system model after the sizing factor determination in step S109 to the user as a candidate of the construction expected system (step S110).

As described above, according to the information system construction assistance device 1 in the exemplary embodiment, the selection screen presentation unit 11 presents a requirement item group selection screen for selecting a requirement item group provided according to a specific task requirement to the user. The input screen presentation unit 12 presents a parameter input screen for inputting parameters included in the selected requirement item group to the user, and the system model selection unit 13 selects a system model satisfying construction requirements based on parameters input by the user. The operation information acquisition unit 14 acquires operation information of an existing system associated with a selected system model group, and the parameter calculation unit 15 calculates evaluation parameters using parameters included in the acquired operation information. The performance evaluation unit 16 evaluates a performance of the selected system model using the evaluation parameters. The sizing factor determination unit 17 compares the evaluated performance of the system model and service level requirements based on the input parameters, and determines a sizing factor of a server included in design information of the selected system model. The construction candidate presentation unit 18 presents an information system constructible using the system model after the sizing factor determination as a candidate of a construction expected system.

Accordingly, the information system construction assistance device 1 is able to select a system model satisfying construction requirements based on parameters input by specifying a specific task requirement by the user as a candidate of a construction expected system. Further, using evaluation parameters calculated based on operation information of an existing system associated with a selected system model group, the information system construction assistance device 1 evaluates non-functional requirements of the selected system model. The information system construction assistance device 1 can compare the evaluation result and service level requirements based on parameters input by the user, determine a sizing factor matched with the requirements input by the user, and present an information system constructible using a system model after the sizing factor determination to the user. In addition, the user can recognize that the construction requirements are relevant to the task requirement selected by himself and therefore, the user can easily grasp that the selected system model is a system model associated with the specific task requirement.

Therefore, the information system construction assistance device 1 in the exemplary embodiment makes it possible to present an optimal information system according to construction requirements desired by the user.

The exemplary embodiment described above is only illustrative and does not exclude various modifications and applications of the technique which are not expressed in the exemplary embodiment. In other words, the present invention can be carried out by being modified to various embodiments without departing from the gist of the present invention.

Figure 9:
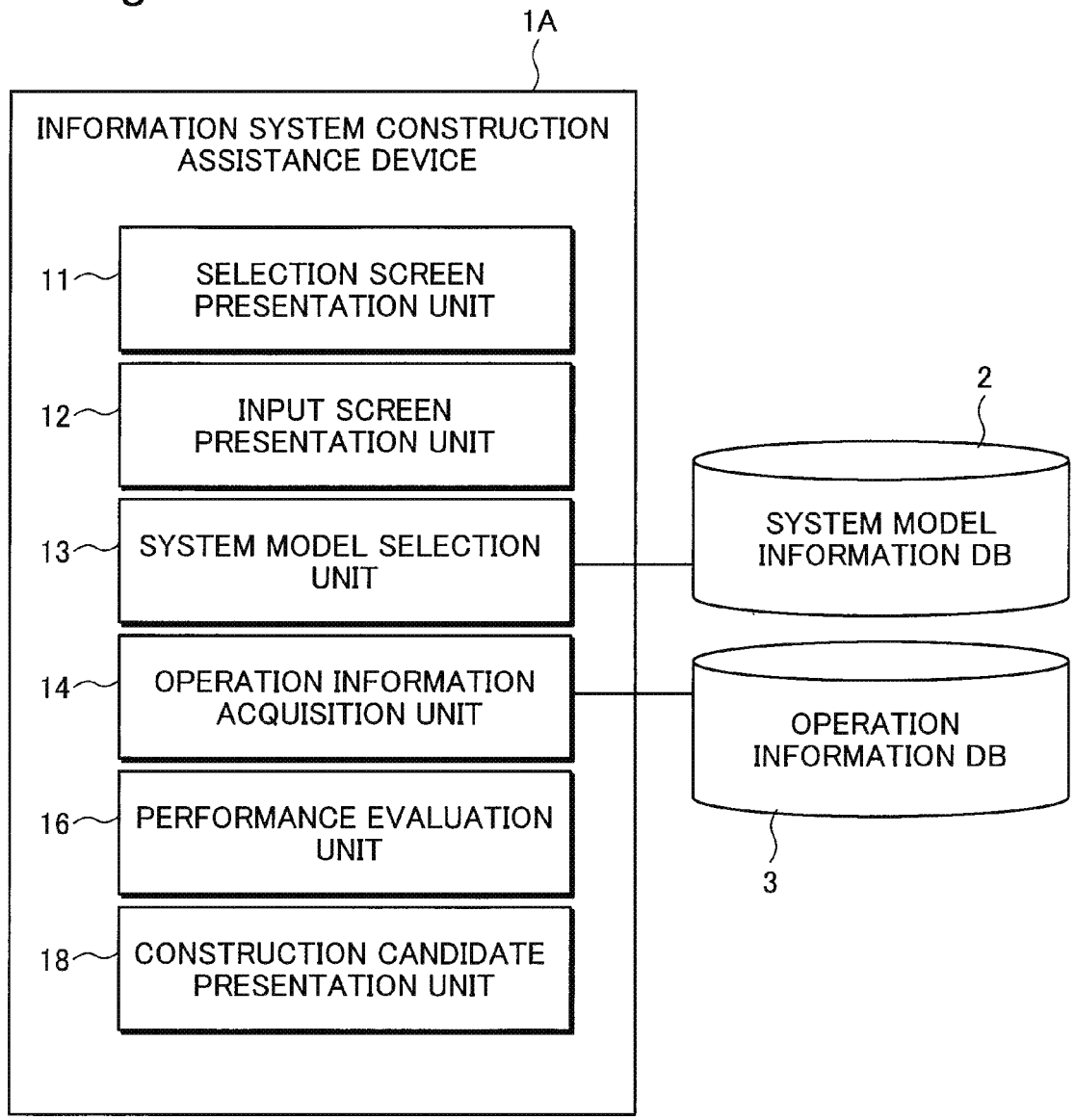
FIG. 9 is a diagram exemplarily illustrating a minimum configuration of the device according to the present invention.

For example, the information system construction assistance device 1 in the exemplary embodiment described above includes the respective functions illustrated in FIG. 1 as constituent elements, but the configuration of the information system construction assistance device according to the present invention is not limited thereto. A minimum configuration of the present invention is described below. FIG. 9 is a diagram exemplarily illustrating a minimum configuration of the information system construction assistance device according to the present invention. An information system construction assistance device 1A illustrated in FIG. 9 is a device obtained by omitting the parameter calculation unit 15 and the sizing factor determination unit 17 from the functions of the information system construction assistance device 1 illustrated in FIG. 1. The omitted functions may be included in an external device connectable via a network.

Figure 10:
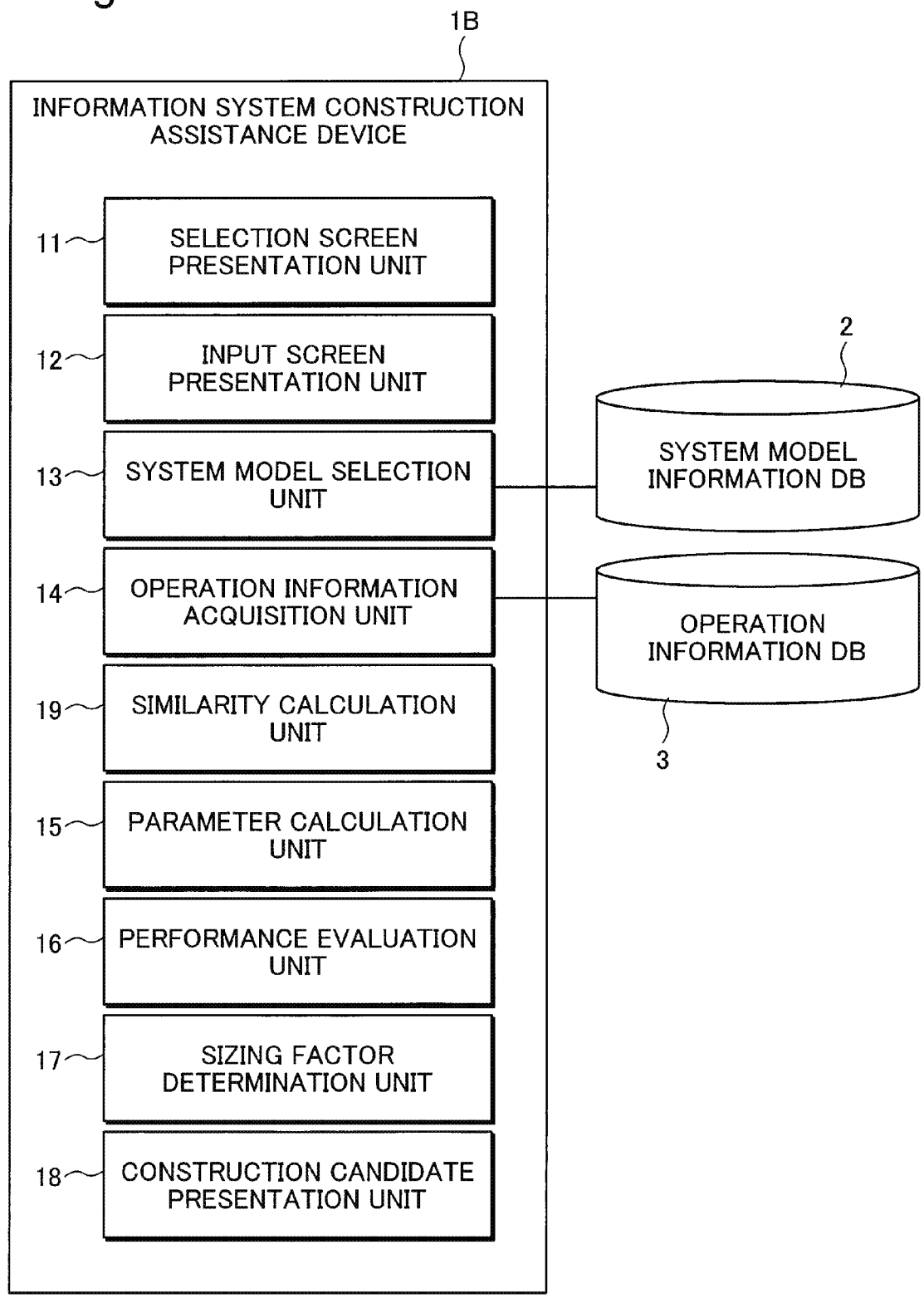
FIG. 10 is a diagram exemplarily illustrating a configuration of an information system construction assistance device in a modified example.

The information system construction assistance device in the exemplary embodiment described above may be added with a similarity calculation function described below as an option. With reference to FIG. 10, a configuration of an information system construction assistance device in the present modified example will be described.

An information system construction assistance device 1B in the modified example is different from the information system construction assistance device 1 in the exemplary embodiment described above in a respect in which a similarity calculation unit 19 is added and a part of the function of the sizing factor determination unit 17 is modified. The configurations other than the above are the same as the respective configurations of the information system construction assistance device 1 in the exemplary embodiment. Therefore, the same reference sign is assigned to each constituent element and description thereof will be omitted. In the following, differences from the exemplary embodiment will be mainly described.

The similarity calculation unit 19 compares parameters which are included in operation information acquired by the operation information acquisition unit 14 and construction requirements based on input parameters, and calculates similarity to the construction requirements based on the input parameters with respect to each piece of operation information.

The sizing factor determination unit 17 determines a sizing factor using robust optimization to be described later, using a reciprocal of the similarity calculated by the similarity calculation unit 19 as a factor of uncertainty, upon determining the sizing factor.

The uncertainty and the robust optimization will be described now. In general, in problems in the world, various uncertainties exist. When, for example, a problem of building a production plan of the future is modeled, data of the past is often used upon setting predicted values for the future demand and cost. These values include prediction errors, and these prediction errors become factors of uncertainty. As a method for dealing with such uncertainty, well-known robust optimization is available. This robust optimization is a method in which a range of uncertainty is previously set, and an optimization is performed by assuming case where the worst case happens within the range. Therefore, a system optimized using robust optimization can achieve the object even when a predicable worst case happens.

In the modified example, a reciprocal of similarity calculated by the similarity calculation unit 19 is used as a factor of uncertainty, and even when the reciprocal of the similarity reaches a predicted worst value, a sizing factor is determined so as to satisfy construction requirements.

In this manner, the information system construction assistance device 1B in the modified example makes it possible to present an information system capable of achieving the object to the user even when a predicable worst case happens, in addition to the effect produced by the information system construction assistance device 1 in the exemplary embodiment.

A part or all of the exemplary embodiments can be described as the following supplementary notes but the present invention is not limited to the following.

(Note 1) An information system construction assistance device comprising:

a selection screen presentation unit that presents a selection screen for selecting a requirement item group provided according to a specific task requirement in inputting construction requirements of a construction expected system that is an information system to be constructed;

an input screen presentation unit that presents an input screen for inputting parameters included in the selected requirement item group;

a system model selection unit that selects a system model satisfying the construction requirements based on the input parameters from the system models set as design information units of a previously stored system;

an operation information acquisition unit that acquires operation information of an existing system that is an already constructed information system, on the basis of the system model selected by the system model selection unit and a similar system model similar to the system model;

a performance evaluation unit that evaluates a performance of the system model selected by the system model selection unit, using parameters which are included in the operation information acquired by the operation information acquisition unit; and a construction candidate presentation unit that compares the performance of the system model evaluated by the performance evaluation unit and the construction requirements based on the input parameters, and presents an information system in which a system factor for determining a size of a system included in the design information of the system model selected by the system model selection unit is constructible by using the selected system model, as a candidate of the construction expected system.

(Note 2) The information system construction assistance device according to Note 1, further comprising:

a similarity calculation unit that calculates similarity to the input construction requirements with respect to each operation information by comparing parameters which are included in the operation information acquired by the operation information acquisition unit and the input construction requirements; and a system factor determination unit that determines the system factor of a server included in the design information of the system model selected by the system model selection unit, by comparing the performance of the system model evaluated by the performance evaluation unit and the construction requirements based on the input parameters, wherein the system factor determination unit determining the system factor by robust optimization using a reciprocal of the similarity calculated in the similarity calculation unit as a factor of uncertainty.

(Note 3) The information system construction assistance device according to Note 2, wherein the construction requirements include functional requirements for determining a role played by an application and service level requirements for determining a guarantee level of quality provided by the construction expected system, and the system factor determination unit compares the performance of the system model evaluated by the performance evaluation unit and the service level requirements including the input parameters.

(Note 4) The information system construction assistance device according to any one of Note 1 to Note 3, wherein the similar system model is the system model of the other design information in which only the system factor is different in the design information of the system model selected by the system model selection unit.

(Note 5) The information system construction assistance device according to any one of Note 1 to Note 4, wherein the performance of the system model includes non-functional requirements.

(Note 6) An information system construction assistance method comprising:

a selection screen presentation step of presenting a selection screen for selecting a requirement item group provided according to a specific task requirement in inputting construction requirements of a construction expected system that is an information system to be constructed;

an input screen presentation step of presenting an input screen for inputting parameters included in the selected requirement item group;

a system model selection step of selecting a system model satisfying the construction requirements based on the input parameters from the system models set as design information units of a previously stored system;

an operation information acquisition step of acquiring operation information of an existing system that is an already constructed information system, on the basis of the system model selected in the system model selection step and a similar system model similar to the system model;

a performance evaluation step of evaluating a performance of the system model selected in the system model selection step, using parameters which are included in the operation information acquired in the operation information acquisition step; and a construction candidate presentation step of comparing the performance of the system model evaluated in the performance evaluation step and the construction requirements based on the input parameters, and presenting an information system in which a system factor for determining a size of a system included in the design information of the system model selected by the system model selection step is constructible by using the selected system model, as a candidate of the construction expected system.

(Note 7) The information system construction assistance method according to Note 6, further comprising:

a similarity calculation step of calculating similarity to the input construction requirements with respect to each operation information by comparing parameters which are included in the operation information acquired in the operation information acquisition step and the input construction requirements; and a system factor determination step of determining the system factor of a server included in the design information of the system model selected in the system model selection step, by comparing the performance of the system model evaluated in the performance evaluation step and the construction requirements based on the input parameters, the system factor determination step determining the system factor by robust optimization using a reciprocal of the similarity calculated in the similarity calculation step as a factor of uncertainty.

(Note 8) The information system construction assistance method according to Note 7, wherein the construction requirements include functional requirements for determining a role played by an application and service level requirements for determining a guarantee level of quality provided by the construction expected system, and the system factor determination step compares the performance of the system model evaluated in the performance evaluation step and the service level requirements including the input parameters.

(Note 9) The information system construction assistance method according to any one of Note 6 to Note 8, wherein the similar system model is the system model of the other design information in which only the system factor is different in the design information of the system model selected in the system model selection step.

(Note 10) The information system construction assistance method according to any one of Note 6 to Note 9, wherein the performance of the system model includes non-functional requirements.

(Note 11) A recording medium that stores an information system construction assistance program causing a computer to execute:

a selection screen presentation step of presenting a selection screen for selecting a requirement item group provided according to a specific task requirement in inputting construction requirements of a construction expected system that is an information system to be constructed;

an input screen presentation step of presenting an input screen for inputting parameters included in the selected requirement item group;

a system model selection step of selecting a system model satisfying the construction requirements based on the input parameters from the system models set as design information units of a previously stored system;

an operation information acquisition step of acquiring operation information of an existing system that is an already constructed information system, on the basis of the system model selected in the system model selection step and a similar system model similar to the system model;

a performance evaluation step of evaluating a performance of the system model selected in the system model selection step, using parameters which are included in the operation information acquired in the operation information acquisition step; and a construction candidate presentation step of comparing the performance of the system model evaluated in the performance evaluation step and the construction requirements based on the input parameters, and presenting an information system in which a system factor for determining a size of a system included in the design information of the system model selected by the system model selection step is constructible by using the selected system model, as a candidate of the construction expected system.

(Note 12) The recording medium that stores the information system construction assistance program according to Note 11, the program causing a computer to execute:

a similarity calculation step of calculating similarity to the input construction requirements with respect to each operation information by comparing parameters which are included in the operation information acquired in the operation information acquisition step and the input construction requirements; and a system factor determination step of determining the system factor of a server included in the design information of the system model selected in the system model selection step, by comparing the performance of the system model evaluated in the performance evaluation step and the construction requirements based on the input parameters, the system factor determination step determining the system factor by robust optimization using a reciprocal of the similarity calculated in the similarity calculation step as a factor of uncertainty.

(Note 13) The recording medium that stores the information system construction assistance program according to Note 11 or Note 12, wherein the construction requirements include functional requirements for determining a role played by an application and service level requirements for determining a guarantee level of quality provided by the construction expected system, and the system factor determination step compares the performance of the system model evaluated in the performance evaluation step and the service level requirements including the input parameters.

(Note 14) The recording medium that stores the information system construction assistance program according to any one of Note 11 to Note 13, wherein the similar system model is the system model of the other design information in which only the system factor is different in the design information of the system model selected in the system model selection step.

(Note 15) The recording medium that stores the information system construction assistance program according to any one of Note 11 to Note 14, wherein the performance of the system model includes non-functional requirements.

This application is based upon and claims the benefit of priority from Japanese Patent Application No. 2012-229304, filed on Oct. 16, 2012, the disclosure of which is incorporated herein in its entirety by reference.

REFERENCE SIGNS LIST 1, 1A, 1B Information system construction assistance device
2 System model information DB
3 Operation information DB
11 Selection screen presentation unit
12 Input screen presentation unit
13 System model selection unit
14 Operation information acquisition unit
15 Parameter calculation unit
16 Performance evaluation unit
17 Sizing factor determination unit
18 Construction candidate presentation unit
19 Similarity calculation unit
91 CPU
92 Storage device
93 Input/output interface
94 Bus

What is claimed is:

1. An information system construction assistance device comprising:

a selection screen presentation unit that presents a selection screen for selecting a requirement item group provided according to a specific task requirement in inputting construction requirements of a construction expected system that is an information system to be constructed;

an input screen presentation unit that presents an input screen for inputting parameters included in the selected requirement item group;

a system model selection unit that selects a system model satisfying the construction requirements based on the input parameters from the system models set as design information units of a previously stored system;

an operation information acquisition unit that acquires operation information of an existing system that is an already constructed information system, on the basis of the system model selected by the system model selection unit and a similar system model similar to the system model;

a performance evaluation unit that evaluates a performance of the system model selected by the system model selection unit, using parameters which are included in the operation information acquired by the operation information acquisition unit;

a construction candidate presentation unit that compares the performance of the system model evaluated by the performance evaluation unit and the construction requirements based on the input parameters, and presents an information system in which a system factor for determining a size of a system included in the design information of the system model selected by the system model selection unit is constructible by using the selected system model, as a candidate of the construction expected system;

a similarity calculation unit that calculates similarity to the input construction requirements with respect to each operation information by comparing parameters which are included in the operation information acquired by the operation information acquisition unit and the input construction requirements;

a system factor determination unit that determines the system factor of a server included in the design information of the system model selected by the system model selection unit, by comparing the performance of the system model evaluated by the performance evaluation unit and the construction requirements based on the input parameters; and the system factor determination unit determining the system factor by robust optimization using a reciprocal of the similarity calculated in the similarity calculation unit as a factor of uncertainty;

wherein the selection screen presentation unit, the input screen presentation unit, the system model selection unit, the operation information acquisition unit, the performance evaluation unit, the construction candidate presentation unit, the similarity calculation unit, and the system factor determination unit are implemented by one or more hardware processors.

2. The information system construction assistance device according to claim 1, wherein the construction requirements include functional requirements for determining a role played by an application and service level requirements for determining a guarantee level of quality provided by the construction expected system, and the system factor determination unit compares the performance of the system model evaluated by the performance evaluation unit and the service level requirements including the input parameters.

3. The information system construction assistance device according to claim 1, wherein the similar system model is the system model of the other design information in which only the system factor is different in the design information of the system model selected by the system model selection unit.

4. The information system construction assistance device according claim 1, wherein the performance of the system model includes non-functional requirements.

5. An information system construction assistance method comprising:

presenting a selection screen for selecting a requirement item group provided according to a specific task requirement in inputting construction requirements of a construction expected system that is an information system to be constructed;

presenting an input screen for inputting parameters included in the selected requirement item group;

selecting a system model satisfying the construction requirements based on the input parameters from the system models set as design information units of a previously stored system;

acquiring operation information of an existing system that is an already constructed information system, on the basis of the selected system model and a similar system model similar to the system model;

evaluating a performance of the selected system model, using parameters which are included in the acquired operation information;

comparing the performance of the system model evaluated and the construction requirements based on the input parameters, and presenting an information system in which a system factor for determining a size of a system included in the design information of the selected system model is constructible by using the selected system model, as a candidate of the construction expected system;

calculating similarity to the input construction requirements with respect to each operation information by comparing parameters which are included in the acquired operation information and the input construction requirements;

determining the system factor of a server included in the design information of the selected system model, by comparing the performance of the evaluated system model and the construction requirements based on the input parameters; and determining the system factor by robust optimization using a reciprocal of the calculated similarity as a factor of uncertainty;

wherein the presenting of the selection screen, the presenting of the input screen, the selecting of the system model, the acquiring of the operation information, the evaluating of the performance, the presenting of the candidate of the construction, the calculating of the similarity, and the determining of the system factor are implemented by one or more hardware processors.

6. The information system construction assistance method according to Claim 5, wherein the construction requirements include functional requirements for determining a role played by an application and service level requirements for determining a guarantee level of quality provided by the construction expected system, and further comprising:

comparing the performance of the evaluated system model and the service level requirements including the input parameters.

7. The information system construction assistance method according to claim 5, wherein the similar system model is the selected system model of the other design information in which only the system factor is different in the design information of the selected system model.

8. The information system construction assistance method according to claim 5, wherein the performance of the system model includes non-functional requirements.

9. A non-transitory computer readable medium that stores an information system construction assistance program causing a computer to execute:

presenting a selection screen for selecting a requirement item group provided according to a specific task requirement in inputting construction requirements of a construction expected system that is an information system to be constructed;

presenting an input screen for inputting parameters included in the selected requirement item group;

selecting a system model satisfying the construction requirements based on the input parameters from the system models set as design information units of a previously stored system;

acquiring operation information of an existing system that is an already constructed information system, on the basis of the selected system model and a similar system model similar to the system model;

evaluating a performance of the selected system model, using parameters which are included in the acquired operation information;

comparing the performance of the evaluated system model and the construction requirements based on the input parameters, and presenting an information system in which a system factor for determining a size of a system included in the design information of the selected system model is constructible by using the selected system model, as a candidate of the construction expected system;

calculating similarity to the input construction requirements with respect to each operation information by comparing parameters which are included in the acquired operation information and the input construction requirements; and determining the system factor of a server included in the design information of the selected system model, by comparing the performance of the evaluated system model and the construction requirements based on the input parameters, determining the system factor by robust optimization using a reciprocal of the calculated similarity as a factor of uncertainty.

10. The non-transitory computer readable medium that stores the information system construction assistance program according to claim 9, wherein the construction requirements include functional requirements for determining a role played by an application and service level requirements for determining a guarantee level of quality provided by the construction expected system, and further comprising:

comparing the performance of the evaluated system model and the service level requirements including the input parameters.

11. The non-transitory computer readable medium that stores the information system construction assistance program according to claim 9, wherein the similar system model is the system model of the other design information in only the system factor is different in the design information of the selected system model.

12. The non-transitory computer readable recording medium that stores the information system construction assistance program according to claim 9, wherein the performance of the system model includes non-functional requirements.

* * * * *